United States Patent
Raju et al.

(10) Patent No.: US 8,694,811 B2
(45) Date of Patent: Apr. 8, 2014

(54) POWER MANAGEMENT FOR DIGITAL DEVICES

(75) Inventors: Veeramanikandan Raju, Bangalore (IN); Saket Sudhir Dandawate, Pune (IN); Sunita Nadampalli, Visakhapatnam (IN); Sundara Raman H, Trichy (IN)

(73) Assignee: Texas Instruments Incorporated, Dallas, TX (US)

( * ) Notice: Subject to any disclaimer, the term of this patent is extended or adjusted under 35 U.S.C. 154(b) by 368 days.

(21) Appl. No.: 12/915,070

(22) Filed: Oct. 29, 2010

(65) Prior Publication Data

US 2012/0110351 A1  May 3, 2012

(51) Int. Cl.
*G06F 1/00* (2006.01)
*G06F 1/26* (2006.01)
*G06F 1/32* (2006.01)

(52) U.S. Cl.
USPC ............ 713/320; 713/300; 713/322; 713/324

(58) Field of Classification Search
USPC ................................. 713/300, 320, 322, 324
See application file for complete search history.

(56) References Cited

U.S. PATENT DOCUMENTS

| | | | |
|---|---|---|---|
| 5,692,204 A * | 11/1997 | Rawson et al. | 713/340 |
| 5,894,579 A * | 4/1999 | Fujihara | 713/324 |
| 6,927,605 B2 * | 8/2005 | Fetzer et al. | 327/101 |
| 2002/0138778 A1 * | 9/2002 | Cole et al. | 713/330 |
| 2007/0050653 A1 * | 3/2007 | Verdun | 713/320 |
| 2009/0204831 A1 * | 8/2009 | Cousson et al. | 713/322 |
| 2009/0265568 A1 * | 10/2009 | Jackson | 713/320 |
| 2010/0157463 A1 * | 6/2010 | Arizono et al. | 360/73.03 |
| 2010/0332876 A1 * | 12/2010 | Fields et al. | 713/323 |
| 2011/0072293 A1 * | 3/2011 | Mazzaferri et al. | 713/340 |
| 2011/0087911 A1 * | 4/2011 | Knirsch | 713/324 |
| 2011/0213994 A1 * | 9/2011 | Thereska et al. | 713/320 |
| 2011/0252248 A1 * | 10/2011 | Cameron et al. | 713/300 |

* cited by examiner

*Primary Examiner* — Mark Connolly
(74) *Attorney, Agent, or Firm* — Wade J. Brady, III; Frederick J. Telecky, Jr.

(57) ABSTRACT

In a digital device, activity of (or load on) one or more processors, peripherals and memory buses are measured. A power management framework operated in the digital device bases power settings in the digital device on the measured loads, and accordingly issues power management commands to change power consumption states of one or more of the processors, peripherals and memory buses. Some user applications (termed power aware applications) in the digital device provide a number identifying their application type to the power management framework, which thereby determines the resources required by the application. The power management commands issued by the power management framework ensure provision of the corresponding resources to the application, while also targeting minimization of power consumption in the digital device. In an embodiment, the digital device corresponds to a mobile phone.

14 Claims, 4 Drawing Sheets

POWER MANAGEMENT FOR DIGITAL DEVICES

BACKGROUND

1. Technical Field

Embodiments of the present disclosure relate generally to power management, and more specifically to techniques for power management for digital devices.

2. Related Art

Digital devices are well known in the relevant arts, and include computers, mobile phones, portable digital assistants (PDA), etc. Digital devices may include one or more processors, peripheral components, memory, display, etc., as is also well known in the relevant arts.

In both battery-operated as well as mains-powered digital devices, power management techniques are often employed with the aim of minimizing the power consumption of digital devices. Several embodiments of the present disclosure are directed to power management for digital devices.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A digital device includes one or more processors, a peripheral component and a memory. The peripheral component and the memory transfer data between each other on a bus using direct memory access (DMA). A power management framework operational in the digital device determines a number of units of data transferred on the bus between the peripheral component and the memory in a prior time interval. The framework computes an estimate of a number of units of data that will be transferred on the memory bus in a future time interval, and issues a power management command to change a power consumption state of at least one processor, the peripheral component and the memory. The determination of the power management command includes the use of the estimate.

A non-transient machine readable medium stores one or more sequences of instructions for managing power consumption in a digital device. The non-transient machine readable medium comprises a first set of instructions constituting a power management framework, and a second set of instructions constituting a first application. The first application when executed in the digital device is designed to send an identifier of the first application to the power management framework, also executing in the digital device. The power management framework when executed in the digital device is designed to determine a resource requirement for executing the first application in the digital device based on the identifier received from the first application, and to generate a set of power management commands to control power consumption in the digital device. The set of power management commands are designed to ensure the provision of the resource requirement to the first application.

The framework allows for flexible approaches in power management to control the operating point (in terms of voltage and frequency) of the digital device through arbitration mechanisms between bus load, processor load, and pre-determined application requests from "power aware" applications. The framework also allows legacy applications to co-exist with applications that are "aware" of the power management techniques employed by the framework.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

In an embodiment, the framework estimates a combined 'future' load on a processor, a peripheral component and a memory bus, and issues power management commands based on the estimated combined future load.

In another embodiment, the framework determines a load on each of a plurality of components in a digital device. The framework normalizes the load thus determined, and computes a statistical measure of a set of past values and a current value for each of the normalized loads to obtain a set of processed load values. The framework maps the set of processed load values to obtain a power management setting. The mapping may be one of a linear mapping and a non-linear mapping. The linear mapping relates the set of processed load values and the power management setting in a linear fashion, wherein, if processed load values have been increasing over a series of power management intervals including a current power management interval and a set of immediately previous and consecutive power management intervals, the linear mapping in the current interval selects a next higher power management setting. The non-linear mapping relates the set of processed load values and the power management setting in a non-linear fashion, wherein, if processed load values have been varying sporadically over a series of power management intervals including a current power management interval and a set of immediately previous and consecutive power management intervals, the non-linear mapping in the current interval selects the highest power management setting.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with examples for illustration.

1. Example Device

Figure 1:
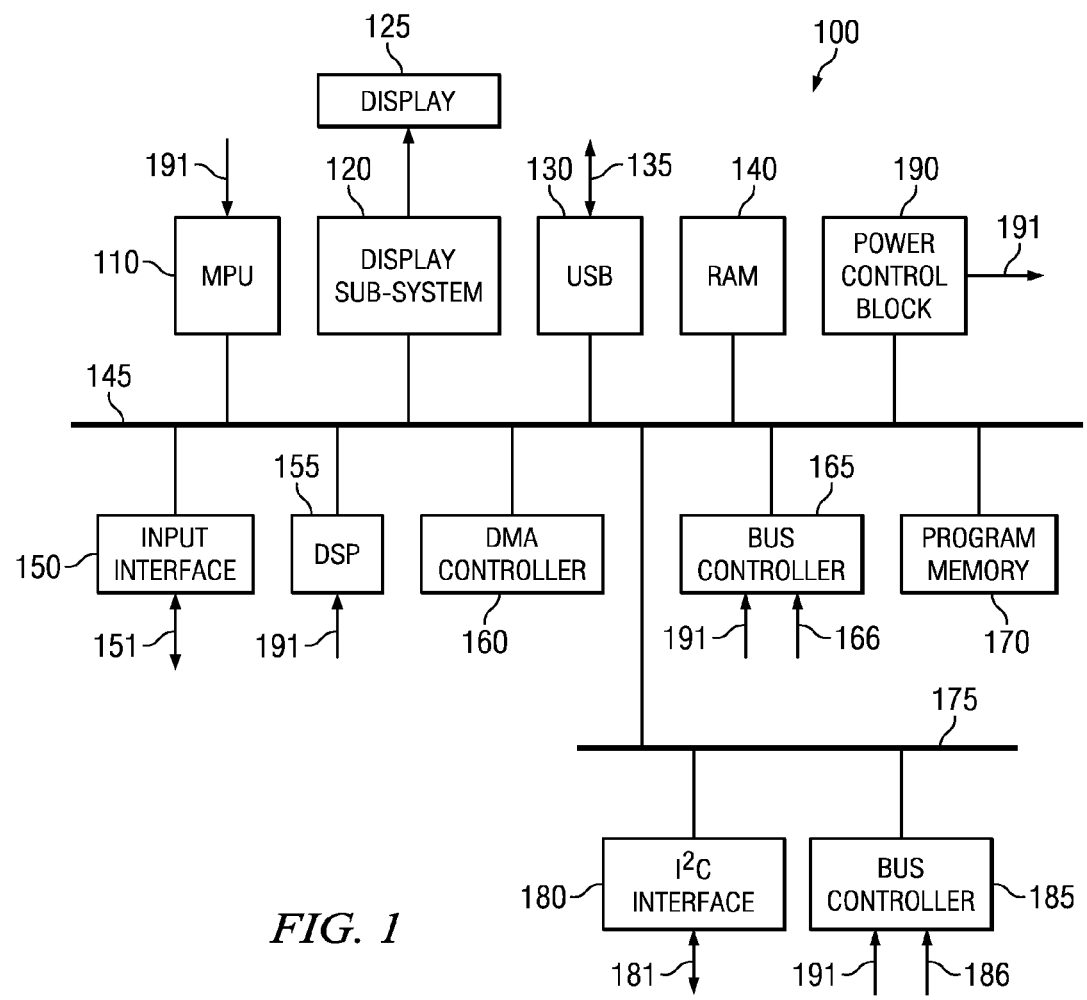
FIG. 1 is a block diagram illustrating the details of an example device in which several embodiments can be implemented.

FIG. 1 is a block diagram illustrating an example device or system in which several embodiments of the present disclosure can be implemented. Mobile phone 100 is shown containing microprocessor unit (MPU) 110, display sub-system (DSS) 120, display 125, universal serial bus (USB) component 130, random access memory (RAM) 140, input interface 150, digital signal processor (DSP) 155, direct memory access (DMA) controller 160, bus controller 165, program memory 170, $I^2C$ interface 180, bus controller 185 and power control block 190. In the interest of conciseness, the radio processing portions, such as modulators, demodulators, up-converters, down-converters, power amplifiers, antennas, etc., are not shown in FIG. 1, but are assumed to be included in mobile phone 100. Mobile phone 100 may be designed to communicate wirelessly using techniques and protocols confirming to standards such as global system for mobile communications (GSM), code division multiple access (CDMA), etc.

In an embodiment, the blocks of FIG. 1, except display 125, may all implemented in a single integrated circuit (IC) as a system-on-chip (SoC). However, in other embodiments, the blocks may be implemented as discrete units, or some combination of discrete units and ICs. The specific blocks/components of mobile phone 100 are shown merely by way of illustration, and typical implementations may contain more or fewer blocks. Further, while embodiments of the present disclosure are described in the context of a mobile phone, other embodiments may be deployed in other types of digital devices as well, as will be apparent to one skilled in the relevant arts on reading the disclosure herein.

Bus 145 represents a shared communication path over which the blocks of FIG. 1 may exchange data with each other. Bus 145 may represent a serial or parallel bus.

MPU 110 executes instructions stored in program memory 170 or RAM 140 to provide several features of mobile phone 100. The features include voice call transmission and reception, data transfers, text messaging, etc. In addition, the features may include user applications such as audio and video playback, still or moving picture recording (using a camera, not shown in FIG. 1), etc.

DSP 155 executes instructions for performing signal processing operations such as audio and video coding and decoding, compression and decompression, image processing, etc. DSP 155 may either operate independent of MPU 110, or be coupled to MPU 110 as a co-processor. When designed to be a co-processor, the operations of DSP 155 may be controlled by MPU 110, with MPU 110 being a master and DSP 155 being a slave. DSP 155 may internally contain the necessary circuit blocks required for signal processing. Such blocks include analog to digital converters, digital to analog converters, etc. In addition, although not shown, DSP 155 may be connected to input and output devices such as a microphone and speaker. For illustration and conciseness, only DSP 155 is noted as being a co-processor in mobile phone 100. In other embodiments, mobile phone 100 can include several of such and other types of co-processors, including for example, a math co-processor.

DSS 120 contains circuitry for generation of images on display 125. Accordingly, DSS 120 may receive commands and image data from MPU 110 (or other blocks such as DSP 155), and generate corresponding signals to cause display 125 to display the images represented by the image data. Display 125 may correspond, for example, to a liquid crystal display (LCD).

USB component 130 may represent a USB master, a USB slave, etc, and transmits and receives data in serial form on path 135 according to the USB protocol(s). Path 135 may be connected to an external USB-compatible device or component connectible to mobile phone 100 through connector (not shown). USB 130 provides data received serially on path 135 to other blocks of mobile phone 100 via bus 145.

RAM 140 represents a volatile memory used for storing instructions (to be executed by MPU 110 and/or DSP 155) and for temporary data storage such as storage of image data, sampled data representing audio signals and image frames, temporary results of processing operations performed by MPU 110 and DSP 155, etc. RAM 140 may be implemented as synchronous (SDRAM) or asynchronous RAM (static RAM, dynamic RAM), etc. Program memory 170 represents a non-volatile storage medium for storing instructions (as well as data) for execution by one or both of MPU 110 and DSP 155. Program memory 170, thus, represents a non-transient computer (or in general, machine) readable medium for storing instructions, which when executed by MPU 110 and/or DSP 155 enable several embodiments of the present disclosure. Program memory 170 may be implemented as flash memory, erasable and programmable read-only memory (EPROM), etc. In particular, program memory 170 stores the operating system, power management framework (described in detail below) and user applications that execute on mobile phone 100. RAM 140 and program memory 165 are together referred to as 'memory', and store respective execution modules and storage repositories that are described in greater detail below with respect to FIG. 2.

Input interface 150 may be connected to an input device (such as a keyboard) via path 151, and enables a user of mobile phone 100 to provide inputs, such as dialing numbers, entering text, selecting user applications stored in mobile phone 100, etc.

DMA controller 160 (peripheral component) performs data transfers between a data source or target (e.g., DSS 120) and RAM 140. As is well known in the relevant arts, direct memory access frees a processor (such as MPU 110) from being completely involved in such transfers. Instead, a processor (or the target/source) device may specify the starting location of a memory block and the size of the memory block that is to be transferred to or from RAM 140.

Bus controller 165 arbitrates access to bus 145. Blocks of FIG. 1 that require access to bus 145 may thus request bus controller 165 for access to bus 145. In response, bus controller 165 may employ corresponding bus arbitration schemes to determine which of the blocks is to be granted access to bus 145, and accordingly grant bus access to the corresponding device. Data transfers on bus 145 are synchronized to a bus clock (bus clock 166), provided on path 166 or generated internally in bus controller 165. The frequency of the bus clock generally determines the rate of data transfer (number of units of data transferred in a unit time) on bus 145. Changing the frequency of bus clock 166 changes the rate of data transfer on bus 145.

Bus 175 represents another shared serial or parallel bus. For conciseness, only one component ($I^2C$ interface 180) is shown communicating on bus 180. Typically however, several components may be connected to bus 175. Bus controller 185 arbitrates access to bus 175 by components (such as $I^2C$ interface) connected to bus 175 in a manner similar to that described above with respect to bus controller 165. Data transfer on bus 175 may be controlled or synchronized with respect to another bus clock (bus clock 186) provided to bus controller 185 (or generated within bus controller 185) on path 186.

I²C interface 180 receives data (for example, in parallel form) on bus 175, and forwards the data in serial form according to the I²C protocol on path 181. Similarly, I²C interface 180 receives data in serial form on path 181 and forwards the data on bus 175.

Power control block 190 executes power management commands. Power control block 190 may receive commands from MPU 110 to adjust (increase or decrease) the value of the power supply voltage provided for operation of MPU 110, and to increase or decrease the operating clock frequency of a clock controlling the operation of MPU 110. In addition, power control block 190 can also be controlled to set MPU 110 in one of several operational states, such as for example, 'normal/full power' state, low-power state, power-down, etc., thereby permitting dynamic power control (DPS) of MPU 110.

Thus, power control block 190 enables DVFS (dynamic voltage and frequency scaling) to be performed on MPU power supply voltage and clock frequency, as is also well known in the relevant arts. Path 191 represents a control path through which control of the various power supplies and clock frequencies noted above can be exercised. The specific connection of control path 191 for effecting power management is meant to be merely illustrative, and power management control as noted above may be exercised through other control paths as well, depending in general on the specific hardware and/or software control that is available in the implementation of mobile phone 100.

In addition to 'conventional' DVFS control on MPU clock and supply voltage, power control block 190 is also controllable (as described in detail in sections below) to adjust the power supply voltage provided for operation of DSP 155, clock frequency of a clock controlling operation of DSP 155, frequencies of bus clocks 166 and 186, refresh rates and other controllable parameters of display 125 (via display sub-system 120), etc., as described in detail below.

The power supplies and some of the clocks are themselves not shown in FIG. 1, but assumed to be provided by corresponding sources which can be controlled by power control block 190 via path 191. In FIG. 1, the sources of the power supplies and clocks provided to MPU 110 and DSP 155 are assumed to be contained within MPU 110 and DSP 155 respectively. The circuits for changing the frequencies of bus clock 166 an bus clock 186 are assumed to be contained in bus controller 165 and bus controller 185 respectively. Control path 191 is connected to each of MPU 110, DSP 155, and bus controllers 165 and 185 for controlling the corresponding power supply voltages and clock frequencies. Frequency of bus clock 166 and 186 may be changed, for example, by writing corresponding values in corresponding registers of bus controllers 165 and 185 respectively.

While in this description individual power management controls are noted as being provided for MPU 110, DSP 155, bus clocks 166 and 186, and DSS 120 only, such power control can, in general, be extended to any block or component of mobile phone 100 where such control is available. In some embodiments, a single power supply voltage and clock frequency may be provided for operation of multiple blocks. For example, a same power supply voltage may be provided for MPU 110 and DSP 155. In such embodiments also power management techniques of this disclosure can be applied.

In an embodiment, power management techniques noted above are executed by corresponding modules of a "power management framework" operational in mobile phone 100. Accordingly, a description of the software module-level framework implemented for operation in mobile phone 100 is provided next.

2. Power Management Framework

Figure 2:
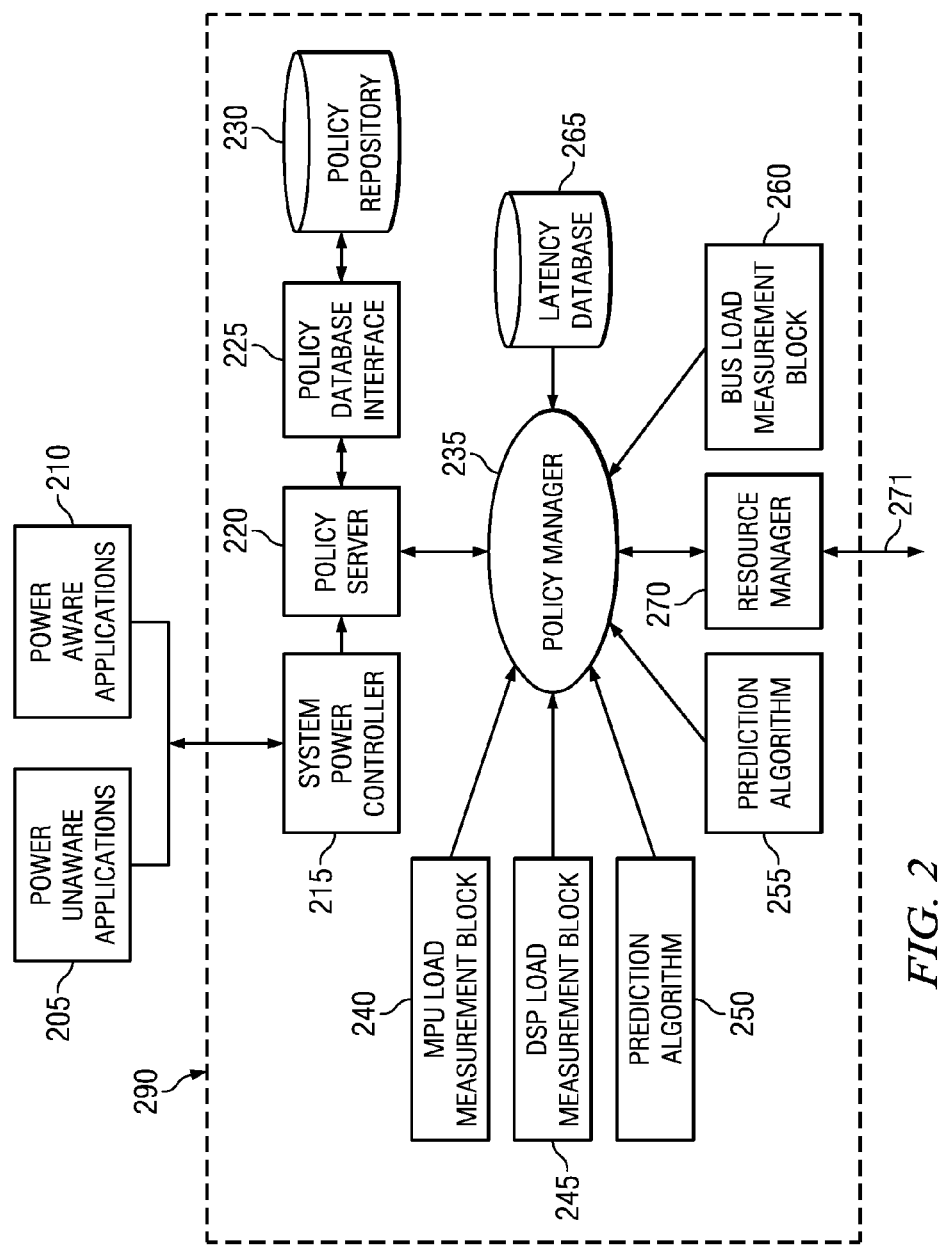
FIG. 2 is a module-level diagram showing the various software modules that constitute a power management framework operating in mobile phone to implement power management functions, in an embodiment.

FIG. 2 is a module-level diagram showing the various software modules that constitute a power management framework operating in mobile phone to implement power management functions, in an embodiment. Typically, corresponding instructions representing the modules of FIG. 2 are executed by MPU 110, which in comparison with DSP 155, may be viewed as the "main" processing unit. However, the specific processing unit that executes some or all of the modules of FIG. 2 may be implementation specific. Modules contained in block 290 together represent a power management framework.

Power unaware applications 205 represents one or more user applications that can be executed on mobile phone 100, and which do not communicate to the rest of the modules of FIG. 2 (via system power controller 215) of the type and extent of hardware resources contained in mobile phone 100 that they require. Access to bus 145 or 175, specifying a bus bandwidth (i.e., the number of data units that need to transferred on the bus(es)), access to one or more functional portions of MPU 110 (requiring such portions to be powered-up), DSP 155, etc., are some examples of hardware resources. Instead, power unaware applications 205 directly invoke corresponding software modules such as device drivers to obtain or relinquish such hardware resources.

Power aware applications 210 represents one or more user applications that can be executed on mobile phone 100, and which specify their application type or profile to policy sever 220 (via system power controller 215). Such specification may be communicated by power aware applications 210 as a 'policy number'.

For example, an audio (e.g., MP3) playback application may provide a corresponding policy number to policy server 220 (via system power controller 215). The policy number serves as a measure of hardware resource requirement of the audio playback application. Power aware applications 210 may also receive from policy server 220 (and via system power controller 215) information specifying the extent of requested hardware resources that have been made available. The mechanism of 'power aware applications' thus enables such applications to be provided the required hardware resources, as well as enabling a power management scheme to include such requirements in decisions relating to power management.

System power controller 215 monitors the number of power unaware and power aware applications as they are invoked for execution by a user, and provides the number to server 220. Monitoring is enabled by the logging of the entry and exit of power aware applications by system power controller 215. System power controller 215 also forwards the policy number sent by each power aware application to policy server 220. In addition, system power controller 215 also calculates the overall inactivity time in the system (mobile phone 100) based on entry and exit of the applications.

Policy server 220 receives policy numbers associated with each power aware application executing (or awaiting execution) in mobile phone 100, and stores the policy numbers in policy repository 230 via policy data interface 225. Based on the policy numbers, policy server 220 provides to policy manager 235, information specifying the corresponding hardware resources required for operation of the power aware applications.

Policy repository 230 stores policy numbers of 'currently active' power aware applications. Policy database interface 225 receives policy numbers from policy server 220. In response, policy database interface 225 generates corresponding database commands for storing the policy numbers in policy repository 230. Policy database interface 225 may also receive requests from policy server 215 for retrieving a current set of policy numbers stored in it, and execute the corresponding commands for retrieving the set.

MPU load measurement block 240 computes a measure of the activity of MPU 110. In an embodiment, MPU load measurement block 240 communicates with a 'CPU-Idle' routine, which is part of an operating system executing on mobile phone 100. The CPU-idle routine is executed whenever no applications or other utilities are 'currently' executing in mobile phone 100. The number of units of time for which execution loops within the CPU-idle routine is measure of the activity (or inactivity) of MPU 110 in a corresponding time interval (referred to herein as the power management interval). MPU load measurement block 240 provides the measure of activity of MPU 110 as an input to policy manager 235.

DSP load measurement block 240 computes a measure of the activity of DSP 155, and provides the measure of activity of DSP 155 as an input to policy manager 235. In an embodiment, the total time that DSP 155 is in an "Idle" loop (i.e., not actively executing any applications) or a ratio of the average amount of time DSP 155 is idle to the amount of time DSP 155 is active (i.e., executing applications) serves as a measure of activity of DSP 155.

Latency database 265 stores the latencies of the various hardware resources contained in mobile phone 100. Latency refers to the extent of time required for a hardware resource to become available for use from the time that a command to use the resource is provided. For example, an "audio decode and store" application may require to sample an incoming audio bit-stream, and may require a corresponding sampling clock. Such a sampling clock may be generated by a delay locked loop (DLL) contained in mobile phone 100 (for example within DSP 155). Prior to using the clock output of the DLL as a sampling clock, the DLL must be powered-ON (if not already ON) and must lock to the corresponding input clock based on which the DLL generates the sampling clock. The time taken by the DLL from the power-up command to the time instance at which the sampling clock is valid and stable may be termed as the latency of the DLL. Similarly, other devices may be associated with latencies prior to providing a corresponding hardware resource for use. Latency database 265 provides to policy manager 235 (or alternatively, policy manager 235 may retrieve from latency database 265) the latencies of the various hardware resources in mobile phone 100. The use of latency information enables effective power management without adversely affecting a desired performance level of an application. For example, with a knowledge of the latency of the DLL noted above, policy manager 235 can incorporate such information in the determination of power management commands such that the power management commands power-ON the DLL sufficiently early, so that a user application requiring to use it does not have to wait for latency duration of the DLL.

Bus load measurement block 260 determines a measure of the activity of on one or more of buses 145 and 175. In an embodiment, each device driver that needs to transfer data on buses 145 or 175 'publishes' the number of data units that it needs to transfer on the corresponding bus. Bus load measurement block 260 obtains all such published information specifying bus activity, and provides the information to policy manager 235. It is noted that the corresponding 'activity measures' provided by each of modules 240, 245 and 260 may be computed for each of a multiple number of time intervals (termed power management decision intervals, for convenience as noted above), with each of the time intervals serving as a basic time unit for which a power management decision is taken by policy manager 235, as described below.

The "publishing" noted above is achieved by obtaining channel programming information (written) in DMA controller 160 for example, by the corresponding driver that needs access to bus 145), the channel programming information specifying the total number of data units that are to be transferred on bus 145. Bus load measurement block 260 obtains all such DMA-channel data transfer units, and combines such information to obtain a total number of data units to be transferred (or that were transferred) on bus 145. However, in other embodiments, bus load measurement can instead be performed by one or more dedicated hardware units in mobile phone 100, and thereafter used by bus load measurement block 260 directly.

Prediction algorithm 250 and prediction algorithm 255 represent example prediction algorithms that are used to predict corresponding activity measures of MPU 110, DSP 155 and buses 145 and 175 at future time intervals. While only two prediction algorithm modules are shown, many more of such prediction algorithms may be operational in mobile phone 100. In general, the prediction algorithms may use custom techniques in conjunction with statistical measurement results of past activity to arrive at predicted future activity of MPU 110, DSP 155 and buses 145 and/or 175. An example prediction technique in an embodiment is described in sections below.

Policy manager 235 represents a module that determines power management decisions to be taken in each "power management interval". Based on the inputs from modules 220, 240, 245, 250, 255, 260 and 265, policy manager 235 provides power management commands to resource manager 270. The power management commands include increasing/decreasing the clock frequency of bus clocks 166 and 186, increasing/decreasing the value(s) of power supply voltage(s) and frequency(ies) of the clock(s) provided for the operation of DSP 155 and MPU 110, as well as other operations as noted above.

Resource manager 270 receives the power management commands from policy manager 235, and writes corresponding commands to control registers of power control block 190. Path 271 represents a path or mechanism through which resource manager 271 'writes' the commands. With respect to FIG. 1, path 271 may correspond to bus 145 (from MPU 110 to power control block 190). However, the specific communication path or link through which resource manager 270 controls the power supplies and clock frequencies may be implementation specific. For example, in some embodiments, resource manager may not directly write to power control block 190 but pass the power management commands to corresponding device drivers that in turn write the commands to power control block 190. Further, while a single hardware block, namely power control block 190, is shown in FIG. 1 as controlling the power supply voltage and clock frequency parameters (power settings, in general), in other embodiments, other units may perform such functions. For example, in some embodiments, each hardware block of FIG. 1 may potentially be provided with its own control block to control the corresponding power supply, clock frequency etc, where applicable.

Irrespective of the specific hardware and software implementation in mobile phone 100, in embodiments of the present disclosure, activity measures of hardware resources in addition to that of the main processor (MPU 110) are obtained. Resource requirements of power aware applications are also obtained. Based on collected activity measures (over one or several power management intervals), activity measures (also termed load) for each of the hardware resources are predicted for a future power management interval. Based on the predicted activity measures and the resource requirements for the power aware applications, power management decisions are taken, and corresponding power management commands are issued.

Figure 3:
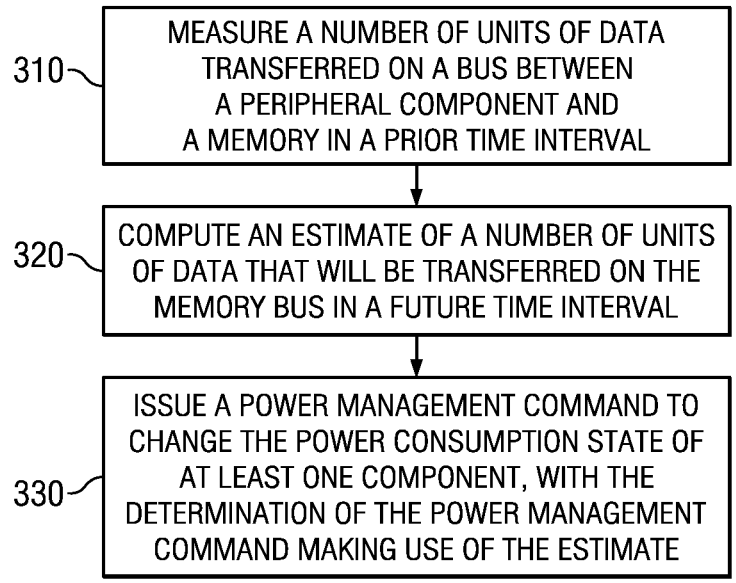
FIG. 3 is a flow diagram illustrating the manner in which power management based on bus activity in a digital device is performed, in an embodiment.

FIG. 3 is a flow diagram illustrating the manner in which power management based on bus activity is performed, in an embodiment. The flow diagram is described with respect to the blocks and modules of FIG. 1 and FIG. 2, and in relation to a mobile phone, merely for illustration. However, various features described herein can be implemented in other digital devices and/or environments and using other components, as will be apparent to one skilled in the relevant arts by reading the disclosure provided herein. Further, the steps in the flow diagram are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein.

In step 310 according to the flow diagram, a number of units of data transferred on a bus between a peripheral component and a memory in mobile phone 100 in a prior time interval is measured. As an example, bus load measurement block 160 may determine the number of units of data transferred on bus 145 between DMA controller 160 and RAM 140. In an embodiment, bus load measurement block 160 makes such a determination by reading the number of bytes published by a device driver as having been transferred on bus 145. In an embodiment, the measurement or determination of step 310 may be performed for each "power management interval". Control then passes to step 320.

In step 320, an estimate of a number of units of data that will be transferred on the bus in a future time interval is computed. As an example, prediction algorithm 255 may perform such a computation, and provide the computed estimate to policy manager 235. Control then passes to step 330.

In step 330, a power management command is issued to change the power consumption state of at least one of a processor, a peripheral component and a memory in mobile phone 100. Power consumption state refers to an operating state of any of the above-noted blocks of mobile phone 100, which is associated with a corresponding power consumption level. For example, when higher the value of a power supply voltage powering DSP 155 higher is its power consumption. Similarly, a higher frequency of the clock of DSP 155 translates to a higher power consumption, and vice versa. The determination of the power management command (i.e., the specific change in the power consumption state to be effected) includes the use of the estimate computed in step 320.

In an embodiment, the power management command changes the value of at least one of a power supply provided to a block and a frequency of a clock provided for operation of the block in mobile phone 100. The block may be a processor, a peripheral component or a memory, as noted above. For example, policy manager 235 may instruct resource manager 270 to change the value of the power supply voltage supplied to DSP 155 or the frequency of bus clock 166 controlling data transfers on bus 145.

According to one prior approach, power management is performed based only on a measure of activity of MPU 110 (typically the main processing unit of mobile phone 100). In embodiments of the present invention, however, activity measures of peripherals and buses are obtained, and power management decisions factor in such activity measures. In addition, conventional DVFS and DPS control of MPU 110 may also be employed.

It may be appreciated that the above techniques of looking beyond merely the activity of MPU 110 in taking power management decisions may substantially improve the effectiveness of the power management scheme. For example, DSP 155 may be inactive when signal processing operations are not performed. In such intervals, lowering the value of power supply voltage or the frequency of the clock provided to DSP 155 reduces power consumption in mobile phone 100. As another example, in intervals when mobile phone 100 is not processing voice calls or playing video images, and is only executing an audio playback application, the refresh frequency of display 125 can be reduced.

In addition, enabling a user application (such as power aware applications 210) to notify policy manager 235 of the resources that are required for their execution, enables power management to be effectively performed while still ensuring that the requested resources are made available to the user application, thereby enabling the user application to potentially operate with maximum speed.

Figure 4:
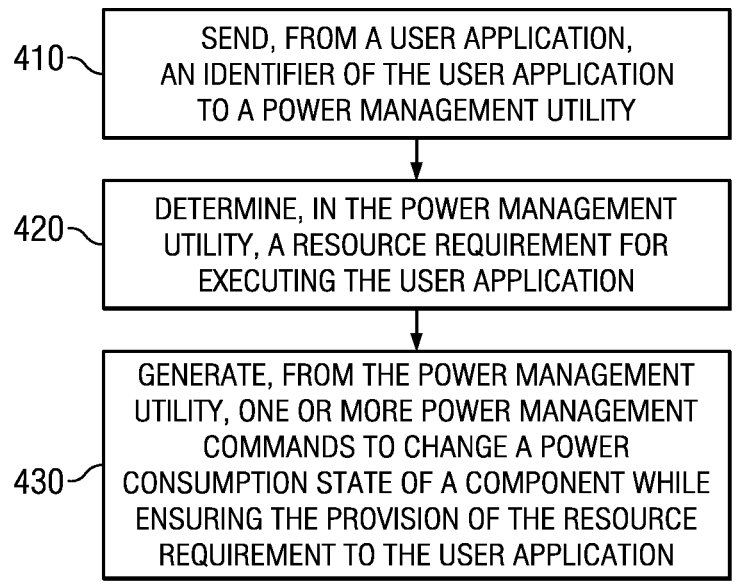
FIG. 4 is a flow diagram illustrating the manner in which a type of user application interacts with a power management framework in a digital device, in an embodiment.

FIG. 4 is a flow diagram illustrating the manner in which power aware applications 210 and policy server 220 interact, in an embodiment. The flow diagram is described with respect to the blocks and modules of FIG. 1 and FIG. 2, and in relation to a mobile phone, merely for illustration. However, various features described herein can be implemented in other digital devices and/or environments and using other components, as will be apparent to one skilled in the relevant arts by reading the disclosure provided herein. Further, the steps in the flow diagram are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein.

In step 410 according to the flow diagram, a user application (first application, represented by a second set of instructions) sends an identifier of the user application to policy manager 235 (power management framework). As noted above, in an embodiment, the identifier corresponds to a policy number. The user application corresponds to a power aware application, i.e., one of the applications represented by power aware applications 210. The power management framework corresponds to the power management framework (block 290) of FIG. 2. Control then passes to step 420.

In step 420, policy manager 235 (represented by a first set of instructions) determines a resource requirement for executing the user application in mobile phone 100. The determination of the resource requirement by policy manager 235 is performed based on the identifier received from the first application. For example, a video playback application may provide its policy number to policy manger 235. The policy number is typically a pre-determined number and maps to an application type, with the mapping between the policy number and the application type being "known" a priori (e.g., as hardcoded information) in policy manager 235. Alternatively, the mapping between the between the policy number and the application type may be provided a priori only to policy server 220 or stored in policy repository 230, and policy server 230 may provide such mapping information to policy manager 235. The policy number "informs" policy manager 235 that the corresponding application is a video playback application, and thus enables policy manager 235 to determine the corresponding resources that may need to be made available to the video playback application. Control then passes to step 430.

In step 430, policy manager 235 generates one or more power management commands to change a power consumption state (control power consumption) of at least one component in mobile phone 100, while ensuring the provision of the resource requirement to the user application. Thus, for example, assuming that the video playback application was not invoked for execution, and thus had not provided its policy number to policy manager 235, and that policy manager 235 may otherwise have issued commands to power-down display 125, DSP 155 and reduce the clock frequency of the bus clock of bus 145, the receipt of the policy number informs policy manager 235 that resources mapped to the policy number need to be provided. Therefore, the power management commands issued by policy manager 235 in step 430 do not power-down display 125 and DSP 155, both of the resources being required for execution of the video play back application. Conversely, if display 125 and DSP 155 are already in a powered-down state, policy manger 235 issues commands to power-ON display 125 and DSP 155. Policy manager may also issue additional commands to change (typically, to reduce) the power consumption state of a component other than display 125 and DSP 155. Thus, the power management commands issued in response to receipt of a policy number from an application are issued to ensure provision of the corresponding resources to the application, while targeting minimization of power consumption in mobile phone 100.

It is noted here that power management framework 290 of FIG. 2 allows the co-existence of power unaware applications 205 and power aware applications 210. As noted above, power unaware applications do not inform policy server 220 (and therefore policy manager 235) of the type of resources that they require, and do not provide a policy number. Thus, assuming only power unaware applications are executing in mobile phone 100, policy manager 235 may initially (for example, immediately after boot-up of mobile phone 100) issue commands to set power consumption states (also referred to generically as power settings herein) of blocks in mobile phone 100 to a default state. Policy manager 235 may make later changes in the power settings based on the inputs received from one or more of blocks 240, 245, 250, 255, 260 and 265.

When both power aware and power unaware applications are active (i.e., active in a same time interval), "framework intelligence" (i.e., the design of the modules of block 290 of FIG. 2) is given higher priority in determining power settings than the power aware application-specific requests. The framework intelligence (represented chiefly by the decisions taken by policy manager 235) ensures that "performance-oriented" power decisions are taken even if it means a higher power consumption in the given circumstances than a power decision which affects the user experience. For example, if a power aware application requires a lower power setting, but the current load conditions indicate requirement for a higher power setting as there are concurrent power unaware applications running, the framework intelligence will decide a "higher power setting" than a "lower power setting" as requested by the power aware application.

As noted above, the specific manner in which policy manager 235 computes a power setting, i.e., the specific power management commands issued by policy manager 235 (to resource manager 270) are based on inputs from blocks 220, 240, 245, 250, 255, 260 and 265. Specifically, and as also described above, policy manager 235 arbitrates between predicted loads (MPU load/activity, DSP load/activity, bus load/activity predicted by blocks 240, 245 and 260 respectively) depending on the requested policies from policy server 220. Accordingly, the manner in which policy manger 235 operates to determine power management commands in an embodiment is described next.

3. Load Prediction and Power Settings Determination

Figure 5:
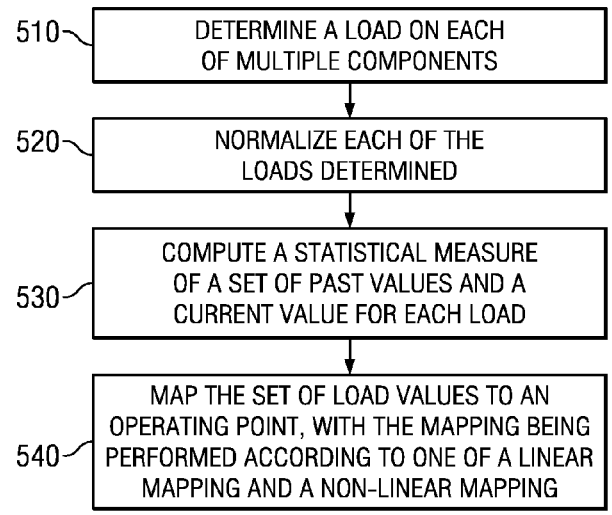
FIG. 5 is a flow diagram illustrating the manner in which power settings of several blocks of a digital device are determined, in an embodiment.

FIG. 5 is a flow diagram illustrating the manner in which power settings of several blocks of mobile phone 100 are determined in an embodiment.

In step 510 according to the flow diagram, a determination of the load on each of multiple components (or blocks) of mobile phone 100 is made. Such determination for MPU 110, DSP 155 and buses 145 and 174 may be made by the corresponding blocks of FIG. 2 as described above. Control then passes to step 520.

In step 520, each of the loads determined in step 510 is normalized, i.e. expressed in terms of (for example as a percentage) of the maximum load possible on the corresponding component. Thus, for example, if the load on bus 145 is determined as M bytes in a unit time (typically equal to the power management interval) for a bus clock frequency of B MHz, then the equivalent value of M as a fraction of the maximum number of bytes transferable at the maximum bus clock frequency in the unit time is computed. Control then passes to 530.

In step 530, a statistical measure of a set of past values and a current value of a load is computed. For example, if N1, N2, N3 and N4 are the normalized bus load values obtained for the past four power management intervals, and if N5 is the normalized bus load for the current power management interval, then a statistical function of the five normalized values N1 through N5 is computed. The statistical function may be any suitable function such as, for example, a moving average or least mean squared (LMS) value of the (five) normalized loads. Similar statistical measures are obtained for the load on MPU 110 and DSP 155 as well. A set of three normalized (and statistically processed) load values are obtained as a result of step 530. Control then passes to 540.

In step 540, the set of three normalized (and statistically processed) load values are mapped to one or more power supply voltages and clock frequencies (or in general, operating points or power management settings). In an embodiment, each of MPU 110 and DSP 155 is powered by a same power supply rail, and a same (single) clock controls the operation of MPU 110, DSP 155 and buses 145 and 175. Accordingly, in the embodiment, the mapping of step 540 returns a single power supply voltage (or voltage range) and a single clock frequency range.

In the embodiment, the mapping between the set of load values received as input to step 540 and the power supply voltage and clock frequency is selectable between one of two functions (or mappings), a linear function and a non-linear function. The functions or maps may be stored in the form of look-up tables, for example in policy repository 230.

The first type of function relates the set of load values and the operating point (i.e., the value of power supply voltage and the clock frequency) in a linear fashion. Thus, if with respect to a current power management interval and a set of immediately previous and consecutive power management intervals, the load (which, in an embodiment, equals the combined load on bus 145 and/or 175, DSP 155 and MPU 110) has been gradually increasing (or decreasing), then the mapping in the current interval selects the next higher (or lower)

operating point, i.e., the next higher range of clock frequency and the next range of power supply voltage.

The second type of function relates the set of load values and the operating point (i.e., the value of power supply voltage and the clock frequency) in a non-linear fashion. Thus, if with respect to a current power management interval and a set of immediately previous and consecutive power management intervals, the load has been varying randomly or sporadically, then the mapping in the current interval selects the highest operating point, i.e. the highest (maximum allowed) value of clock frequency and power supply voltage. Subsequently, i.e., in subsequent power management intervals, the operating point may sequentially be reduced to correspond to lower ranges, provided the load measurements indicate that such may be performed.

Which of the two types of functions is to be used for the mapping may be determined a priori by a user or an application. The second type of function is typically used if it is desired ensure maximum allocation of resources to an application, but may be less power-efficient than the first type of function. The two types of functions noted above are provided merely by way of illustration. Other types of empirically-determined mappings may also be used based on specific operational scenarios.

The operations of step 510 may be performed by blocks 240, 245 and 260 of FIG. 2. The operations of steps 520, 530 and 540 may be performed by policy manager 235. Once the operating point for the next power management interval is determined, policy manager 235 provides the corresponding power management commands to resource manager 270 (FIG. 2), which in turn implements the power settings as noted above.

It may be appreciated that the load prediction and power settings determination technique described with respect to FIG. 5 combines a measure of how effectively bus 145 (or 175) is being utilized in the system along with load conditions on MPU 110 and/or DSP 155. Power management is thereby rendered more flexible and effective. Thus, for example, when MPU 110 is inactive, but RAM 140 is being used (via bus 145) by applications through DMA-based transfers, then power management can still target bus 145 for power management. Similarly, when the DMA-based data transfer is not being used, and only MPU and RAM 140 are active, then DMA controller 160 can be powered-down. In contrast, and as noted above, some prior approaches to power management in digital devices only control the power supply voltage and clock frequency of MPU 110.

Figure 6:
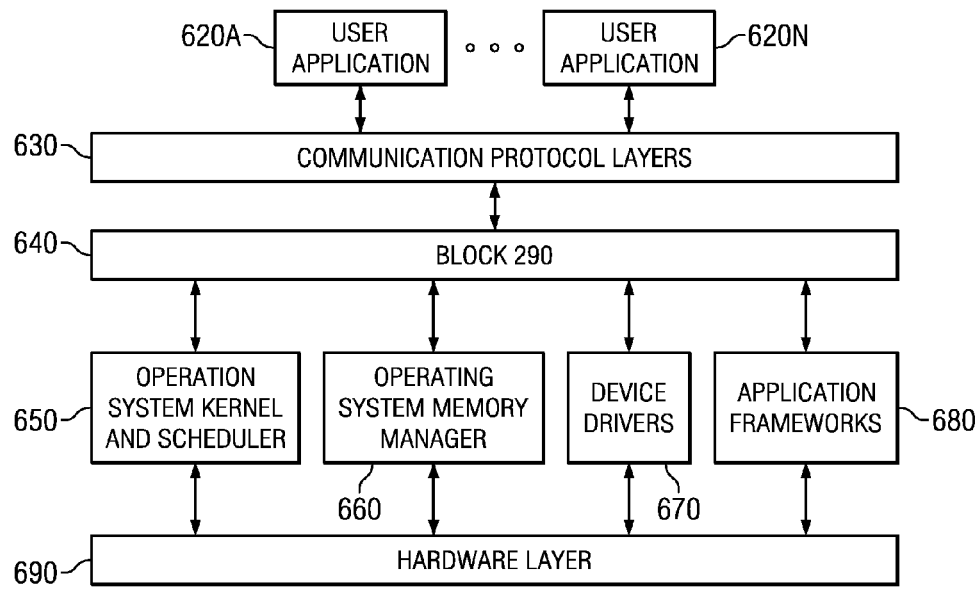
FIG. 6 is a diagram showing a block level hierarchy of software and hardware components in a digital device, in an embodiment.

FIG. 6 is a diagram showing a block level hierarchy of blocks and modules (software as well as hardware) in mobile phone 100. User applications 620A-620N represent applications that can be executed on mobile phone, and include power unaware applications 205 and power aware applications 210 of FIG. 2. Communication protocol layers 630 represent API (Application Programmers Interface) routines that are provided to user applications 620A-620N for communicating with block 290 and the other 'lower-level' modules of FIG. 6. Block 290 represents the correspondingly numbered block 290 of FIG. 2, and represents a framework that operates to provide power management in mobile phone 100.

Operating system kernel and scheduler 650 represents components of an operating system (OS) loaded on mobile phone 100, and serves to provide OS features such as management of execution of user applications 620-620N, sharing of resources in mobile phone 100 between requesting applications, etc. OS memory manager 660 performs memory management operations such as evaluating the validity of memory requests from user applications, allocation of memory space (in RAM 140) to the user applications, etc. Device drivers 670 represent input/output (I/O) routines that mediate between higher-level modules (such as block 290 and user applications 620A-620N) of FIG. 6 and hardware resources in hardware layer 690. The higher-level modules control hardware resources via device drivers 670. Application Frameworks 680 represent operating system middleware framework components such as multimedia frameworks, file system framework, user experience frameworks, etc. These framework components drive the use-case level functionality to be enabled by interfacing with other components in the system. Hardware layer 790 represents the hardware components of mobile phone 100, such as those shown in FIG. 1.

It should be understood that numerous specific details, relationships, and methods are set forth to provide a full understanding of the invention. For example, many of the functions units described in this specification have been labeled as modules/blocks in order to more particularly emphasize their implementation independence.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of managing power consumption in a digital device, the digital device comprising one or more processors, a peripheral component and a memory, wherein the peripheral component and the memory transfer data between each other on a bus using direct memory access (DMA), the method comprising:
    determining a number of units of data transferred on the bus between the peripheral component and the memory in a prior time interval;
    computing an estimate of a number of units of data that will be transferred on the memory bus in a future time interval; and
    issuing a power management command to change a power consumption state of at least one of the one or more processors, the peripheral component and the memory, wherein the determination of the power management command includes the use of the estimate;
    wherein the issuing a power management command is designed to change a value of at least one of a power supply voltage supplied to the one or more processors or the peripheral component, a frequency of a clock controlling the operations of the one or more processors or the peripheral component, and a frequency of a bus clock controlling a rate of transfer of data on the bus; and
    wherein the transfer of data on the bus is controlled by a bus controller, wherein the bus controller receives the bus clock, wherein the changing comprises writing a value to the bus controller to modify the frequency of the bus clock.

2. The method of claim 1, further comprises
    retrieving a value specifying a latency of a hardware resource in the digital device,
    wherein the determination of the power management command includes the use of the latency for an application specifying the latency.

3. The method of claim 1, wherein the digital device is a mobile phone, and wherein the one or more processors, the peripheral component, the memory and a bus controller are all fabricated in integrated circuit (IC) form on a system-on chip (SOC).

4. A method of managing power consumption in a digital device, the digital device comprising one or more processors, a peripheral component and a memory, wherein the peripheral component and the memory transfer data between each other on a bus using direct memory access (DMA), the method comprising:
- determining a number of units of data transferred on the bus between the peripheral component and the memory in a prior time interval;
- computing an estimate of a number of units of data that will be transferred on the memory bus in a future time interval;
- issuing a power management command to change a power consumption state of at least one of the one or more processors, the peripheral component and the memory, wherein the determination of the power management command includes the use of the estimate, wherein the issuing a power management command is designed to change a value of at least one of a power supply voltage supplied to the one or more processors or the peripheral component, a frequency of a clock controlling the operations of the one or more processors or the peripheral component, and a frequency of a bus clock controlling a rate of transfer of data on the bus
- measuring an activity level of a first processor in the one or more processors in the prior time interval;
- computing an estimate of an activity level of the first processor in the future time interval; and
- adjusting either a value of a first power supply voltage supplied to the first processor or a frequency of a first clock controlling the operation of the first processor.

5. The method of claim 4, wherein the first processor is a co-processor optimized for performing digital signal processing, the one or more processors comprising a second processor for executing one or more user applications.

6. A non-transient machine readable medium storing one or more sequences of instructions for managing power consumption in a digital device, the non-transient machine readable medium comprising:
- a first set of instructions constituting a power management framework;
- a second set of instructions constituting a first application which when executed in the digital device is designed to send an identifier of the first application to the power management framework executing in the digital device;
- the first set of instructions when executed in the digital device being designed to determine a resource requirement for executing the first application in the digital device, wherein the determining is performed based on the identifier received from the first application, and
- to generate a set of power management commands to control power consumption in the digital device, wherein the set of power management commands are designed to ensure the provision of the resource requirement to the first application, wherein the resource requirement includes at least one of a power supply voltage supplied to a component in the digital device, a frequency of a clock controlling the operations of the component, or a frequency of a bus clock controlling a rate of transfer of data on a bus coupled between the component and a memory contained in the digital device, and wherein the power management framework performs a first set of actions to generate the set of power management commands, wherein the first set of actions comprises:
  - determining a load on each of a plurality of components comprised in the digital device;
  - normalizing the load determined on each of the plurality of components;
  - computing a statistical measure of a set of past values and a current value for each of the normalized loads to obtain a set of processed load values; and
  - mapping the set of processed load values to a power management setting.

7. The non-transient machine readable medium of claim 6, wherein the to generate a set of power management commands comprises:
- measuring, in a prior time interval, one or both of an activity level of the component, and a number of units of data transferred on the bus between the component and the memory; and computing, for a future time interval, an estimate of the activity level of the component and a number of units of data that will be transferred on the bus;
- wherein the set of power management commands adjusts a value of the power supply voltage supplied to the component, a frequency of the clock controlling the operations of the component, and a frequency of a bus clock controlling a rate of transfer of data.

8. The non-transient machine readable medium of claim 7, wherein the component is one of a processor, a peripheral and a memory.

9. The non-transient machine readable medium of claim 6, wherein the mapping is one of a linear mapping and a non-linear mapping.

10. The non-transient machine readable medium of claim 9, wherein the linear mapping relates the set of processed load values and the power management setting in a linear fashion, wherein, if processed load values have been increasing over a series of power management intervals including a current power management interval and a set of immediately previous and consecutive power management intervals, the linear mapping in the current interval selects a next higher power management setting.

11. The non-transient machine readable medium of claim 9, wherein the non-linear mapping relates the set of processed load values and the power management setting in a non-linear fashion,
wherein, if processed load values have been varying sporadically over a series of power management intervals including a current power management interval and a set of immediately previous and consecutive power management intervals, the non-linear mapping in the current interval selects the highest power management setting.

12. A method of determining a power management setting in a digital device, the method being performed by a power management framework operational in the digital device, the method comprising:
- determining a load on each of a plurality of components comprised in the digital device;
- normalizing the load determined on each of the plurality of components;
- computing a statistical measure of a set of past values and a current value for each of the normalized loads to obtain a set of processed load values; and
- mapping the set of processed load values are mapped to obtain the a power management setting,
- wherein the mapping is one of a linear mapping and a non-linear mapping.

13. The method of claim 12, wherein the linear mapping relates the set of processed load values and the power management setting in a linear fashion, wherein, if processed load values have been increasing over a series of power management intervals including a current power management interval and a set of immediately previous and consecutive power management intervals, the linear mapping in the current interval selects a next higher power management setting.

14. The non-transient machine readable medium of claim 12, wherein the non-linear mapping relates the set of processed load values and the power management setting in a non-linear fashion,
wherein, if processed load values have been varying sporadically over a series of power management intervals including a current power management interval and a set of immediately previous and consecutive power management intervals, the non-linear mapping in the current interval selects the highest power management setting.

* * * * *